(12) United States Patent
Hatano

(10) Patent No.: US 7,062,375 B2
(45) Date of Patent: *Jun. 13, 2006

(54) NAVIGATION TERMINAL AND METHOD OF PROCESSING DATA FOR A NAVIGATION SYSTEM

(75) Inventor: Ichiro Hatano, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 97 days.

This patent is subject to a terminal disclaimer.

(21) Appl. No.: 10/318,012

(22) Filed: Dec. 13, 2002

(65) Prior Publication Data

US 2003/0083809 A1 May 1, 2003

Related U.S. Application Data

(63) Continuation of application No. 09/797,812, filed on Mar. 5, 2001, now Pat. No. 6,532,417.

(30) Foreign Application Priority Data

Mar. 3, 2000 (JP) ...................................... P2000-63381

(51) Int. Cl.
*G01C 21/00* (2006.01)

(52) U.S. Cl. .................... 701/207; 701/208; 340/988
(58) Field of Classification Search ................ 701/200, 701/207, 208, 211, 24; 342/357.01, 357.09, 342/357.1; 340/988, 990, 995
See application file for complete search history.

(56) References Cited

U.S. PATENT DOCUMENTS

| 5,504,482 | A | 4/1996 | Schreder |
| 5,699,255 | A | 12/1997 | Ellis et al. |
| 6,282,464 | B1 * | 8/2001 | Obradovich ................... 701/1 |
| 6,292,743 | B1 | 9/2001 | Pu et al. |
| 6,295,503 | B1 * | 9/2001 | Inoue et al. ................ 701/209 |
| 6,532,417 | B1 * | 3/2003 | Hatano ....................... 701/207 |

FOREIGN PATENT DOCUMENTS

| DE | 198 32 035 A1 | 2/1999 |
| EP | 0 785 535 A1 | 7/1997 |

* cited by examiner

*Primary Examiner*—Yonel Beaulieu
(74) *Attorney, Agent, or Firm*—Sughrue Mion, PLLC

(57) ABSTRACT

A navigation terminal 2 loaded in a vehicle 1 is provided with a wireless communication device connectable to a movable communications network 3 and a present position detection device and instructs implementation of a predetermined navigation function. The gateway apparatus 4 connects the movable communications network 3 and the Internet 5 and implements protocol conversion and charging processing. A navigation server 6 acquires positional data of the vehicle 1 from the navigation terminal 2 via the Internet 5, discriminates map data to be a distribution object to the navigation terminal 2, and generates navigation information based on the instructed navigation function to provide it to the navigation terminal 2. A map search server 7 reads map data discriminated as the distribution object from a map data base 8 accumulating map data and distributes them to the navigation terminal 2 via the Internet 5.

19 Claims, 13 Drawing Sheets

| USER ID | CONTRACT FEATURE | CHARGING INFORMATION | DISTRIBUTION INFORMATION |
|---|---|---|---|
| 0001 | BASIC+OPTION | 3,400 YEN | BLOCKS 5,12··· |
| 0002 | BASIC | 1,200 YEN | BLOCKS 14,32··· |
| 0003 | BASIC+OPTION | 18,500 YEN | BLOCKS 82,83··· |
| ⋮ | | | |
| 000n | BASIC | 800 YEN | NO BLOCK |

FIG. 9

SERVICE AND CHARGE

| <BASIC SERVICE> | <CHARGE> |
|---|---|
| MAP DISTRIBUTION | 10 YEN/ONE BLOCK |
| ROUTE SEARCH | 100 YEN/ONE TIME |
| APPLICATION SEARCH | 200 YEN/ONE TIME |
| VICS DISTRIBUTION | 1,000 YEN/MONTH |
| TELEPHONE FUNCTION | 2,000 YEN/MONTH |
| <OPTION SERVICE> | |
| VOICE RECOGNITION | 500 YEN/MONTH |
| EMERGENCY REPORT SERVICE | 1,000 YEN/MONTH |
| CONTENTS DISTRIBUTION | 1,000 YEN/MONTH |

FIG. 13

| USER ID | CONTRACT FEATURE | CHARGING INFORMATION | HARD DISK PRESERVATION INFORMATION | DISTRIBUTION INFORMATION | TRAVEL HISTORY INFORMATION |
|---|---|---|---|---|---|
| 0001 | BASIC+OPTION | 3,400 YEN | BLOCKS 5, ... | BLOCKS 5, 12 ... | BLOCK 5 : 3 TIMES ... |
| 0002 | BASIC | 1,200 YEN | BLOCKS 32 ... | BLOCKS 14, 32 ... | BLOCK 14 : 1 TIME ... |
| 0003 | BASIC+OPTION | 18,500 YEN | NO BLOCK | BLOCKS 82, 83 ... | BLOCK 82 : 10 TIMES ... |
| .... | | | | | |
| 000n | BASIC | 800 YEN | NO BLOCK | NO BLOCK | NO BLOCK |

NAVIGATION TERMINAL AND METHOD OF PROCESSING DATA FOR A NAVIGATION SYSTEM

This is a continuation of application Ser. No. 09/797,812 filed Mar. 5, 2001, now U.S. Pat. No. 6,532,417; the disclosure of which is incorporated herein by reference.

BACKGROUND OF THE INVENTION

1. Field of the Invention

The present invention relates to a navigation system, a navigation information providing server, and a navigation server for detecting a position of a movable body to perform navigation, and more specifically relates to a technical field of a navigation system, a navigation information providing server, and a navigation server for wirelessly connecting to the Internet to perform navigation, employing map data distributed.

2. Description of the Prior Art

Conventionally, a navigation system performing navigation of a vehicle by employing map data has been widely used. In a navigation system like this, navigation is achieved by carrying a GPS (Global Positioning System) to acquire positional data of a movable body and collating them with map data read from a recording medium to operate various applications such as a route search by software.

On the other hand, as a communication device of a movable body, a movable body terminal employing wireless communication such as a portable telephone has diffused rapidly. Recently, this type of movable body terminal can perform not only general communication but also various data transmission/reception by connection to the Internet. Accordingly, when this type of wireless communication function is added to a navigation apparatus described above, for example, it becomes possible to hold map data on the Internet and to download them. In this type of navigation system, since it is not necessary to employ a recording medium on which map data are recorded, the system is convenient for users.

However, adding the wireless communication function for downloading map data to a conventional navigation apparatus causes an increase of the cost of the entire apparatus drastically. Compared with the case wherein map data are provided through a recording medium, it becomes necessary to construct a charging system or the like for the time of downloading map data through the Internet, causing complexity in a system structure.

SUMMARY OF THE INVENTION

The present invention was developed considering this type of problem, and it is an object of the present invention to provide a navigation system, a navigation information providing server, and a navigation server in which a system and a server for charging can be constructed reasonably without increasing the cost of the device drastically, employing a wireless communication device in the navigation system.

The above object of the present invention can be achieved by a navigation system for providing data from a server to a navigation terminal via a network in accordance with the present invention. The navigation system is provided with: the navigation terminal comprising a wireless communication device connected to the network by wireless communication to send and receive data; a present position detection device for detecting a present position of a movable body; and an instruction device for instructing a predetermined navigation function; a navigation server for acquiring positional data corresponding to the detected present position via the network, discriminating map data to be a distribution object to the navigation terminal based on the positional data, and generating navigation information based on the instructed navigation function to provide it to the navigation terminal; and a map search server having a memory device for accumulating map data and reading the map data discriminated as the distribution object from the memory device to distribute it to the navigation terminal via the network.

According to the navigation system of the present invention, when the present position detection device of the navigation terminal detects a present position of a movable body, the wireless communication device of the navigation terminal sends the detected present position to the network by wireless communication. Then, when the instruction device of the navigation terminal instructs a predetermined navigation function, the wireless communication device sends the instruction of the predetermined navigation function to the network by wireless communication. On the other hand, the navigation server acquires positional data corresponding to the detected present position via the network. Then, the navigation server discriminates map data to be a distribution object to the navigation terminal based on the positional data. Further, the navigation server generates navigation information based on the instructed navigation function and provides it to the navigation terminal. Then, the map search server reads the map data discriminated as the distribution object from the memory device and distributes it to the navigation terminal via the network. Accordingly, the navigation information and the map data are received by the wireless communication device of the navigation terminal from the network by wireless communication.

Therefore, it is not necessary for the navigation terminal to have an application generating navigation information and map data. As a result, the structure is simple, and a cost reduction of the apparatus is possible.

In one aspect of the navigation system, a gateway apparatus is provided between the wireless communication device and the network. The gateway apparatus controls mutual data communication. Then, charging information for the navigation terminal is generated according to a condition of data communication that the gateway apparatus controls.

Therefore, since data communication between the wireless communication device of the navigation terminal and the navigation server, or between the wireless communication device and the map search server is controlled by the gateway apparatus so as to utilize the gateway apparatus for charging the data terminal, charging system in the navigation system constructed over the network can be simplified.

In another aspect of the navigation system, the navigation server discriminates map data of a predetermined area of a point and the vicinity of it corresponding to the acquired positional data as a distribution object.

Therefore, since the map data regarding a peripheral part of the positional data necessary for navigation on a map is distributed to the navigation terminal when the navigation server generates navigation information, the data size at the time of distribution can be restricted. As a result, an advantage arises for a user in both fields of communication speed and charge.

In another aspect of the navigation system, the navigation server provides a route search function searching an optimum route heading for a destination from the present position when a route search is instructed by the navigation terminal.

Therefore, since the navigation server searches the optimum route when the instruction of the route search is outputted from the navigation terminal, the route that a user should take can be grasped without complex calculation in the navigation terminal.

In another aspect of the navigation system, the navigation server discriminates the map data of the predetermined area along the searched optimum route as the distribution object when providing the route search function.

Therefore, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation system, regarding the map data an entire map is divided into mesh-like blocks, and the map data have a data structure in which map data of the respective blocks assemble.

Therefore, since the entire map is divided into mesh-like blocks and the map data have the data structure in which map data of the respective blocks assemble, it is possible to select map data of plural blocks superimposed in a predetermined area and easily discriminate map data of the distribution object.

In another aspect of the navigation system, the map data are stratified into a plurality of levels having different block sizes according to a degree of scaling down, the degree of scaling down of the map data to be the distribution object is changed according to a condition, and map data of a different hierarchy is distributed to the navigation terminal.

Therefore, since a plurality of levels of blocks constructing map data are prepared according to the degree of scaling down, the wide area map data and detailed map data can be selectively utilized according to the transmission data amount and drawing quality at the time of distribution of the map data.

In another aspect of the navigation system, the navigation terminal functions as a movable body telephone unit connectable to a telephone line via a movable communications network.

Therefore, since the navigation terminal as the movable body telephone unit is connected to the movable communications network so that the above described navigation information is provided to a user, the user can make use of it with a sense that a navigation function is added to a portable phone.

In another aspect of the navigation system, the navigation terminal further comprises a nonvolatile memory device in which map data received from the map search server are stored.

Therefore, since the navigation terminal has the nonvolatile memory device such as the hard disk and the distributed map data are stored in the memory device, map data which have been stored once in the memory device can be utilized again later on. As a result, the navigation can be performed reasonably.

In another aspect of the navigation system, the map data which have been already stored in the nonvolatile memory device are not distributed from the map search server to the navigation terminal.

Therefore, since only the map data which have not been stored are distributed referring to a storing condition of the memory device of the navigation terminal, useless transmission is not performed, and an advantage arises for a user in a field of charge mainly and in a field of speedy information update.

The above object of the present invention can be achieved by a navigation information providing server for providing information including map data to a navigation terminal via a network in accordance with the present invention. The navigation information providing server is provided with: a generating device for generating navigation information based on navigation function instructed by the navigation terminal via the network; a providing device for providing the generated navigation information to the navigation terminal; an acquiring device for acquiring positional data corresponding to a present position of a movable body from the navigation terminal via the network; a discriminating device for discriminating map data of a predetermined area of a point and the vicinity of it corresponding to the acquired positional data as a distribution object; a map memory device for accumulating map data; a reading device for reading the map data discriminated as the distribution object from the map memory device; and a distributing device for distributing the read map data to the navigation terminal via the network.

According to the navigation information providing server of the present invention, the generating device generates the navigation information based on navigation function instructed by the navigation terminal via the network. Then, the providing device provides the generated navigation information to the navigation terminal. Further, when the acquiring device acquires positional data corresponding to the present position of the movable body from the navigation terminal via the network, the discriminating device discriminates the map data of the predetermined area of the point and the vicinity of it corresponding to the acquired positional data as the distribution object. After that, the reading device reads the map data discriminated as the distribution object from the map memory device accumulating the map data. Then, the distributing device distributes the read map data to the navigation terminal via the network.

Therefore, since the map data regarding a peripheral part of the positional data necessary for navigation on a map is distributed to the navigation terminal when the navigation server generates navigation information, the data size at the time of distribution can be restricted. As a result, an advantage arises for a user in both fields of communication speed and charge.

In one aspect of the navigation information providing server, a management table including information about the map data distributed to the navigation terminal is stored in a table memory device. Then, the discriminating device discriminates map data except the distributed map data as the distribution object with reference to the management table stored in the table memory device.

Therefore, since the map data already distributed is not distributed to the navigation terminal again, the data size at the time of distribution can be restricted. As a result, an advantage arises for a user in both fields of communication speed and charge.

In another aspect of the navigation information providing server, when the present position of the movable body acquired via the network indicates that the movable body has approached the outer periphery of a predetermined area in which the movable body is included merely by a predetermined distance, the discriminating device discriminates the map data to be distributed next as the distribution object.

Therefore, it is possible to prevent a situation where the distribution of map data is delayed and drawing in a display section of the navigation terminal is hindered.

In another aspect of the navigation information providing server, a route searching device searches an optimum route heading for a destination from the present position of the movable body acquired via the network when a route search is instructed by the navigation terminal. Then, the discriminating device discriminates the map data of the predetermined area along the searched optimum route as the distribution object.

Therefore, since the navigation server searches the optimum route when the instruction of the route search is outputted from the navigation terminal, the route that a user should take can be grasped without complex calculation in the navigation terminal. Further, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation information providing server, the discriminating device discriminates wide area map data of the predetermined area along the searched optimum route as the distribution object initially, and then enlarged narrow area of map data of the predetermined area as the distribution object according to advance condition of the movable body.

Therefore, the movable body changes its route or the like, useless data transmission can be prevented.

In another aspect of the navigation information providing server, the discriminating device discriminates wide area map data of the predetermined area along the searched optimum route as the distribution object, and enlarged narrow area of map data of the intersection and the vicinity of it as the distribution object if the present position of the movable body acquired via the network is a position corresponding to the intersection and the vicinity of it.

Therefore, the movable body changes its route or the like, useless data transmission can be prevented.

In another aspect of the navigation information providing server, if the searched optimum route includes a place where radio waves do not reach, the distributing device distributes the map data corresponding to the place and the vicinity of it to the navigation terminal via the network in advance that the movable body approaches the place and the vicinity of it.

Therefore, when the movable body moves to a place where radio waves of a base station reach, distribution of map data is resumed, whereby navigation can be implemented continuously.

In another aspect of the navigation information providing server, regarding the map data an entire map is divided into mesh-like blocks, and the map data have a data structure in which map data of the respective blocks assemble.

Therefore, since the entire map is divided into mesh-like blocks and the map data have the data structure in which map data of the respective blocks assemble, it is possible to select map data of plural blocks superimposed in a predetermined area and easily discriminate map data of the distribution object.

The above object of the present invention can be achieved by a navigation information providing server for providing information including map data to a navigation terminal having a nonvolatile memory device for storing the map data acquired from the navigation information providing server via a network in accordance with the present invention. The navigation information providing server is provided with: a generating device for generating navigation information based on navigation function instructed by the navigation terminal via the network; a providing device for providing the generated navigation information to the navigation terminal; an acquiring device for acquiring positional data corresponding to a present position of a movable body from the navigation terminal via the network; a discriminating device for discriminating map data of a predetermined area of a point and the vicinity of it corresponding to the acquired positional data as a distribution object; a map memory device for accumulating map data; a reading device for reading the map data discriminated as the distribution object from the map memory device; a distributing device for distributing the read map data to the navigation terminal via the network; and a table memory device for storing a management table including information about the map data distributed to the navigation terminal. Further, the discriminating device discriminates map data except the distributed map data as the distribution object with reference to the management table stored in the table memory table device.

According to the navigation information providing server, the generating device generates navigation information based on navigation function instructed by the navigation terminal via the network. Then, the providing device provides the generated navigation information to the navigation terminal. Further, when the acquiring device acquires positional data corresponding to the present position of the movable body from the navigation terminal via the network, the discriminating device discriminates map data of the predetermined area of the point and the vicinity of it corresponding to the acquired positional data as the distribution object. After that, the reading device reads the map data discriminated as the distribution object from the map memory device accumulating the map data. Then, the distributing device distributes the read map data to the navigation terminal via the network. Moreover, the management table including information about the map data distributed to the navigation terminal is stored in the table memory device. Then, the discriminating device discriminates map data except the distributed map data as the distribution object with reference to the management table stored in the table memory table device.

Therefore, since the map data regarding a peripheral part of the positional data necessary for navigation on a map is distributed to the navigation terminal when the navigation server generates navigation information, the data size at the time of distribution can be restricted. As a result, an advantage arises for a user in both fields of communication speed and charge. Further, since the map data already distributed is not distributed to the navigation terminal again, the data size at the time of distribution can be restricted. As a result, an advantage arises for a user in both fields of communication speed and charge.

In one aspect of the navigation information providing server, a time stamp is added to the map data, and the discriminating device discriminates the distributed map data as the distribution object if the time stamp is different even in the same map data.

Therefore, it becomes possible to deal with a case where the map data are updated due to a new construction of a road, a new establishment of a point, and the like.

In another aspect of the navigation information providing server, a route searching device for searching an optimum route heading for a destination from the present position of the movable body acquired via the network when a route search is instructed by the navigation terminal. Further, wherein the discriminating device discriminates the map data of the predetermined area along the searched optimum route except the distributed map data as the distribution object with reference to the management table stored in the table memory table.

Therefore, since the navigation server searches the optimum route when the instruction of the route search is outputted from the navigation terminal, the route that a user should take can be grasped without complex calculation in the navigation terminal. Further, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation information providing server, the management table further includes information about the map data stored in the nonvolatile memory device of the navigation terminal.

Therefore, for example, the user can download the travel history information from the navigation information providing server and can record it. Further, the user can delete map data of an area where travel frequency is low in accordance with the travel history information.

In another aspect of the navigation information providing server, the management table further includes information about search history information showing history regarding a search condition of a place included in the searched optimum route by the route searching device, and the providing device further provides advertisement information related to the place as the navigation information.

Therefore, if the user frequently searches a specific place such as an amusement park, it is possible to provide useful information to the user.

In another aspect of the navigation information providing server, regarding the map data an entire map is divided into mesh-like blocks, and the map data have a data structure in which map data of the respective blocks assemble.

Therefore, since the entire map is divided into mesh-like blocks and the map data have the data structure in which map data of the respective blocks assemble, it is possible to select map data of plural blocks superimposed in a predetermined area and easily discriminate map data of the distribution object.

The above object of the present invention can be achieved by a navigation server for providing navigation information to a navigation terminal via a network with which a map search server having a map memory device for accumulating map data is connected. The navigation server is provided with: a generating device for generating navigation information based on navigation function instructed by the navigation terminal via the network; a providing device for providing the generated navigation information to the navigation terminal; an acquiring device for acquiring positional data corresponding to a present position of a movable body from the navigation terminal via the network; and a discriminating device for discriminating map data of a predetermined area of a point and the vicinity of it corresponding to the acquired positional data as a distribution object by the map search server.

According to the navigation server, the generating device generates navigation information based on the navigation function instructed by the navigation terminal via the network. Then, the providing device provides the generated navigation information to the navigation terminal. Further, the acquiring device acquires the positional data corresponding to the present position of the movable body from the navigation terminal via the network. Then, the discriminating device discriminates the map data of the predetermined area of the point and the vicinity of it corresponding to the acquired positional data as a distribution object by the map search server.

Therefore, since the map data regarding a peripheral part of the positional data necessary for navigation on a map is distributed to the navigation terminal when the navigation server generates navigation information, the data size at the time of distribution can be restricted. As a result, an advantage arises for a user in both fields of communication speed and charge.

In another aspect of the navigation server, a management table including information about the map data distributed to the navigation terminal is stored in a table memory device. Then, the discriminating device discriminates map data except the distributed map data as the distribution object with reference to the management table stored in the table memory table.

Therefore, it is possible to prevent a situation where the distribution of map data is delayed and drawing in a display section of the navigation terminal is hindered.

In another aspect of the navigation server, when the present position of the movable body acquired via the network indicates that the movable body has approached the outer periphery of a predetermined area in which the movable body is included merely by a predetermined distance, the discriminating device discriminates the map data to be distributed next as the distribution object.

Therefore, since the navigation server searches the optimum route when the instruction of the route search is outputted from the navigation terminal, the route that a user should take can be grasped without complex calculation in the navigation terminal. Further, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation server, a route searching device searches an optimum route heading for a destination from the present position of the movable body received via the network when a route search is instructed by the navigation terminal. Further, the discriminating device discriminates the map data of the predetermined area along the searched optimum route as the distribution object with reference to the management table stored in the table memory device.

Therefore, since the navigation server searches the optimum route when the instruction of the route search is outputted from the navigation terminal, the route that a user should take can be grasped without complex calculation in the navigation terminal. Further, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation server, the discriminating device discriminates wide area map data of the predetermined area along the searched optimum route as the distribution object initially, and then enlarged narrow area of map data of the predetermined area as the distribution object according to advance condition of the movable body.

Therefore, the movable body changes its route or the like, useless data transmission can be prevented.

In another aspect of the navigation server according to claim 7, wherein the discriminating device discriminates wide area map data of the predetermined area along the searched optimum route as the distribution object, and enlarged narrow area of map data of the intersection and the vicinity of it as the distribution object if the present position of the movable body acquired via the network is a position corresponding to the intersection and the vicinity of it.

Therefore, the movable body changes its route or the like, useless data transmission can be prevented.

In another aspect of the navigation server, if the searched optimum route includes a place where radio waves do not reach, the distributing device distributes the map data corresponding to the place and the vicinity of it to the navigation terminal via the network in advance that the movable body approaches the place and the vicinity of it.

Therefore, when the movable body moves to a place where radio waves of a base station reach, distribution of map data is resumed, whereby navigation can be implemented continuously.

The above object of the present invention can be achieved by a navigation server for providing navigation information to a navigation terminal having a nonvolatile memory device in which the map data acquired from a map search server via a network. The navigation server is provided with: a generating device for generating navigation information based on navigation function instructed by the navigation terminal via the network; a providing device for providing the generated navigation information to the navigation terminal; an acquiring device for acquiring positional data corresponding to a present position of a movable body from the navigation terminal via the network; a discriminating device for discriminating map data of a predetermined area of a point and the vicinity of it corresponding to the acquired positional data as a distribution object by the map search server; and a table memory device for storing a management table including information about the map data distributed to the navigation terminal. Further, the discriminating device discriminates map data except the distributed map data as the distribution object with reference to the management table stored in the table memory device.

According to the navigation server, the generating device generates the navigation information based on the navigation function instructed by the navigation terminal via the network. Then, the providing device provides the generated navigation information to the navigation terminal. Further, when the acquiring device acquires the positional data corresponding to the present position of the movable body from the navigation terminal via the network, the discriminating device discriminates the map data of the predetermined area of the point and the vicinity of it corresponding to the acquired positional data as the distribution object by the map search server. Moreover, a management table including information about the map data distributed to the navigation terminal is stored in the table memory device. Then, the discriminating device discriminates map data except the distributed map data as the distribution object with reference to the management table stored in the table memory device.

Therefore, since the map data regarding a peripheral part of the positional data necessary for navigation on a map is distributed to the navigation terminal when the navigation server generates navigation information, the data size at the time of distribution can be restricted. As a result, an advantage arises for a user in both fields of communication speed and charge. Further, since the map data already distributed is not distributed to the navigation terminal again, the data size at the time of distribution can be restricted. As a result, an advantage arises for a user in both fields of communication speed and charge.

In one aspect of the navigation server, a time stamp is added to the map data, and the discriminating device discriminates the distributed map data as the distribution object if the time stamp is different even in the same map data.

Therefore, it becomes possible to deal with a case where the map data are updated due to a new construction of a road, a new establishment of a point, and the like.

In another aspect of the navigation server, a route searching device searches an optimum route heading for a destination from the present position of the movable body acquired via the network when a route search is instructed by the navigation terminal. Then, the discriminating device discriminates the map data of the predetermined area along the searched optimum route except the distributed map data as the distribution object with reference to the management table stored in the table memory device.

Therefore, since the navigation server searches the optimum route when the instruction of the route search is outputted from the navigation terminal, the route that a user should take can be grasped without complex calculation in the navigation terminal. Further, since map data along the optimum route are selectively distributed to the navigation terminal when the navigation server searches the optimum route, the data size of the time of distribution accompanied by the route search can be restricted. As a result, an advantage arises for a user in both fields of communication speed and charge.

In another aspect of the navigation server, the management table further includes information about the map data stored in the nonvolatile memory device of the navigation terminal.

Therefore, for example, the user can download the travel history information from the navigation information providing server and can record it. Further, the user can delete map data of an area where travel frequency is low in accordance with the travel history information.

In another aspect of the navigation server, the management table further includes information about search history information showing history regarding a search condition of a place included in the searched optimum route by the route searching device, and the providing device further provides advertisement information related to the place as the navigation information.

Therefore, if the user frequently searches a specific place such as an amusement park, it is possible to provide useful information to the user.

BRIEF DESCRIPTION OF THE DRAWINGS

FIG. 4 is a diagram showing a concrete example of a discrimination method for map blocks to be a distribution object in map data of a present position and the vicinity of it in the first embodiment;

FIG. 8 is a diagram showing a configuration of a management table of a navigation server in the first embodiment;

FIG. 9 is a diagram showing a concrete example of services provided as a navigation function and its charging modes of the first embodiment;

FIG. 13 is a diagram showing a configuration of a management table of a navigation server in the second embodiment.

DESCRIPTION OF THE PREFERRED EMBODIMENTS

Preferred embodiments of the present invention will be explained below based on drawings. In the preferred embodiments the present invention is applied to a case where a navigation terminal having a function of an automovable telephone unit is mounted in a vehicle. This case is explained as a representative embodiment although the present invention can be applied even to a navigation terminal employed in a movable body other than a vehicle.
(System Configuration)

Figure 1:
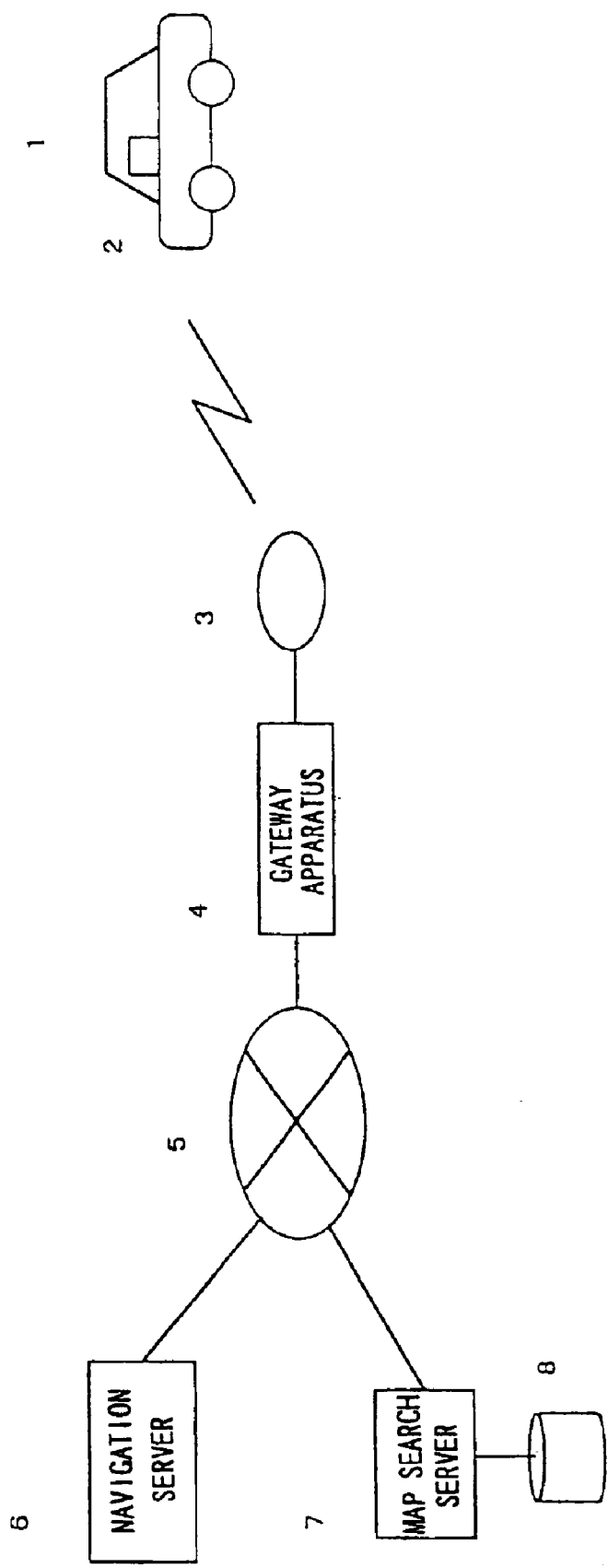
FIG. 1 is a block diagram showing a system configuration of a navigation system according to an embodiment of the present invention.

FIG. 1 is a block diagram showing a system configuration of a navigation system according to a present embodiment. As shown in FIG. 1, a navigation terminal 2 mounted in a vehicle 1 is wirelessly connected to a movable communications network 3. In addition, a gateway apparatus 4 managing the movable communications network 3, a navigation server 6, and a map search server 7 provided with a map data base 8 are connected to each other via the Internet 5.

In FIG. 1, when the vehicle 1 moves, a present position of the vehicle 1 is detected in the navigation terminal 2 to generate positional data. A number of base stations are included in the movable communications network 3, and by operating a wireless communication apparatus contained in the navigation terminal 2, radio waves are sent or received between a base station located in an area corresponding to the position of the vehicle to perform a desired data communication. Details in the configuration and operations of the navigation terminal 2 will be described later.

On the other hand, the gateway apparatus 4 controls data transmission/reception between the movable communications network 3 and the Internet 5 and performed conversion between TCP/IP (Transmission Control Protocol/Internet Protocol), which is the protocol of the Internet 5, and the protocol of the movable communications network 3 to play a role connecting both mutually. The data sent from or received in the navigation terminal 2 are sent as packet data in the gateway apparatus 4. The gateway apparatus 4 monitors the data amount and the data type of the packet data that the navigation terminal 2 sends or receives and, based on these, generates and manages charging information that will be described later.

Each of the navigation server 6 and the map search server 7 generates in the Internet 5 navigation information that is necessary in the navigation terminal 2, playing a role realizing a navigation function. The navigation server 6 generates the navigation information and performs various applications by an instruction on the navigation terminal 2 to provide its result to a user. The map search server 7 searches map data accumulated in the map database 8 and facility information related to the map data and distributes them to the navigation terminal 2 via the Internet 5.

The navigation server 6 receives positional data of the vehicle 1 and a command signal from the navigation terminal 2 via the Internet 5 and performs, for example, an application such as route search processing by predetermined software. On the other hand, the navigation server 6 selectively reads necessary map data and the like from the map data base 8 and instructs the map search server 7 to send them to the navigation terminal 2.

The navigation server 6 holds a management table described later in a memory device and stores various management information in the management table regarding all users of the navigation terminal 6 to refer to management information as the need arises. Such management information includes a distribution history of map data for each user, an implementation history of each application, charging information acquired from the gateway apparatus 4, and the like.

Further, the navigation server 6 can acquire VICS (Vehicle Information Communication System) information from the outside to provide it to the navigation terminal 2 and can receive an command of an emergency report from the navigation terminal 2 to perform report processing to the outside. Thus, the navigation server 6 can add numerous feasible functions by sending data to the outside and can provide them to the navigation terminal 2.

Map data containing road shape data are stored in the map data base 8 as a memory device, and further various related data such as related facility data, name data, and the like are coordinated with road shape data and are stored therein. As a data configuration of map data, the entire map is divided into mesh-like blocks, for example, files are allocated to the respective blocks, and these are gathered to construct the entire map data. It is supposed that with respect to each of the blocks, a position on a map can be determined, for example, by latitude and longitude enclosing all sides. The blocked map data are set hierarchically at a plurality of levels according to the degree of scaling down, and map data of a different hierarchy can be employed corresponding to a display range at the time of navigation.

Next, concrete configurations and operations of the navigation system according to the present embodiment are explained. In the present embodiment, there are two embodiments corresponding to whether or not a hard disk as a nonvolatile memory device for storing map data that are downloaded from the map search server 2 is loaded in the navigation terminal 2. A first embodiment corresponds to a case where a hard disk is not loaded in the navigation terminal 2, and a second embodiment corresponds to a case where a hard disk is loaded in the navigation terminal 2, and they are explained respectively below.

(First Embodiment)

Figure 2:
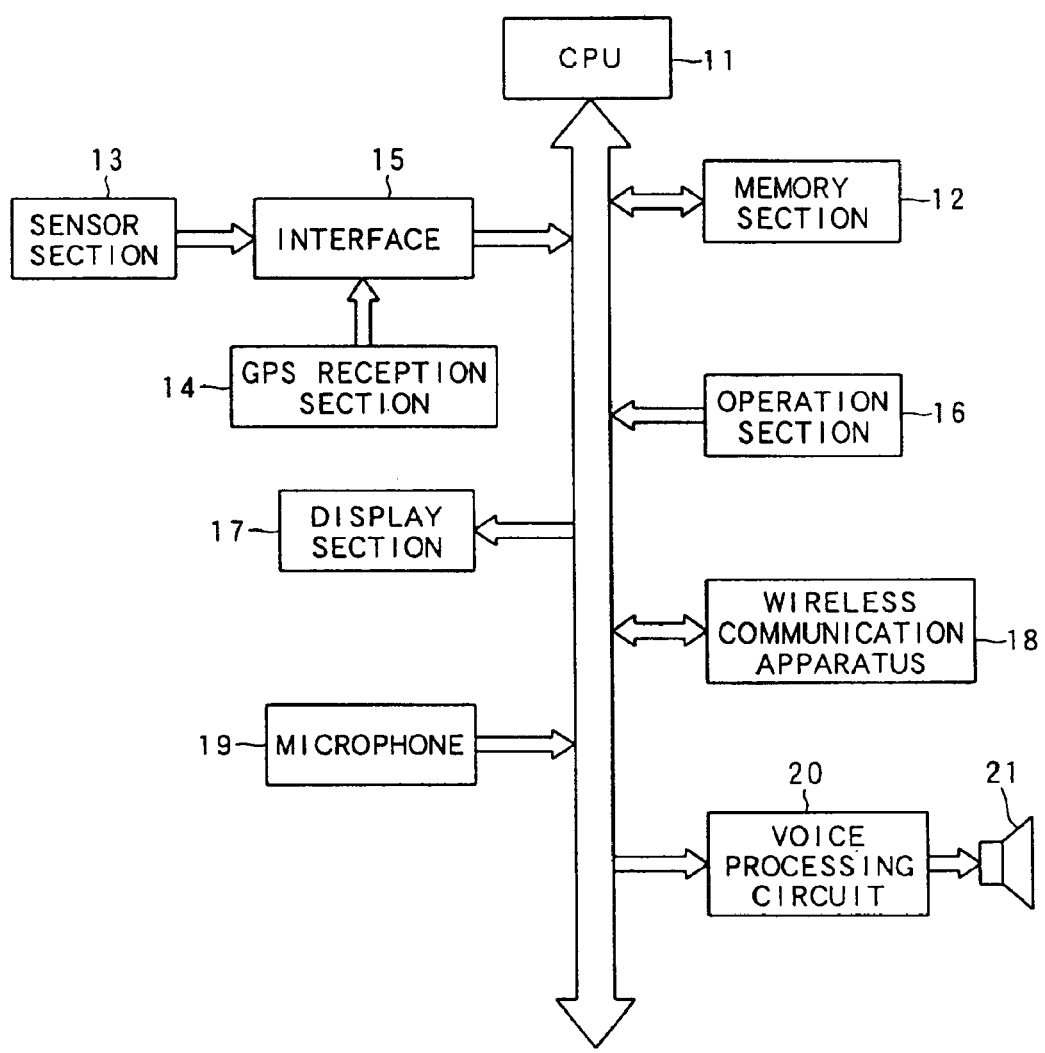
FIG. 2 is a block diagram showing a hardware configuration of a navigation terminal in a first embodiment of the present invention.

FIG. 2 is a block diagram showing a hardware configuration of the navigation terminal 2 in the first embodiment. As shown in FIG. 2, the navigation terminal 2 is provided with a CPU 11, a memory section 12, a sensor section 13, a GPS reception section 14, an interface 15, an operation section 16, a display section 17, a wireless communication apparatus 18, a microphone 19, a voice processing circuit 20, and a speaker 21.

In FIG. 2, the CPU 11 sends a control signal to each component of the navigation terminal 2 to control their operations. The memory section 12 is composed of a ROM storing a control program of the CPU 11, a RAM temporarily holding in-process data, and the like.

The sensor section 13 is provided with various sensors such as a vehicle speed sensor, a travel distance sensor, and a direction sensor for detecting a present position. The GPS reception section 14 receives radio waves from a GPS satellite and outputs measured positional data. The sensor section 13 and the GPS reception section 14 function as a device for detecting a present position of the vehicle 1, being coupled with the CPU 11. The interface 15 performs an interface operation between the sensor section 13, the GPS reception section 14, and the CPU 11. The CPU 11 seeks positional data of the vehicle 1 based on a sensor output from the sensor section 13 and the measured positional data from the GPS reception section 14. Thus, the sensor section 13 and the GPS reception section 14, being coupled with the CPU 11, function as a present position detection device of the present invention.

The display section 17 is a display device for displaying a menu and map data at the time of the navigation and is, for example, composed of a CRT, a liquid crystal display element, and the like. In the display section 17, map data are displayed in various modes and a present position is superimposed thereon and displayed as a car mark.

The operation section 16 functions as an instruction device of the present invention and is composed of arranged various keys and various buttons for performing desired operations in a navigation operation. The operation section 16 is provided in a main body unit of a navigation system or an outside remote controller, and when the various keys and various buttons arranged therein are pressed down, a corresponding detection signal is sent to the CPU 11 so that various functions such as the navigation operation, a wireless connection operation, and the like are implemented.

The wireless communication apparatus 18 as a wireless communication device is wirelessly connected to the movable communications network 3 described above and is a device for sending/receiving various data and voice information. For the wireless communication apparatus 18, for example, a wide band digital public movable communication method such as IMT-2000 (International Movable Telecommunication System-2000) can be employed. By this wireless communication apparatus 18, an instruction to generate navigation information based on a navigation function can be outputted for the navigation server 6 described above, map data or search data can be downloaded from the map search server 7, and voice data of the time of telecommunication can be sent and received.

The microphone 19, the voice processing circuit 20, and the speaker 21 are employed for a hands free telephoning by the navigation terminal 2. When a telephone function of the navigation terminal 2 in the present embodiment is employed, for the sake of security during moving, hands free telephoning is constantly operated. At the time of telecommunication by the navigation terminal 2, voice that a user utters is inputted to the microphone 19, and a voice signal from the side of a communicating partner is amplified to an appropriate level in the voice processing circuit 20 and is then outputted from the speaker 21. A guidance voice or the like is outputted from the speaker 21 for leading the route of the vehicle 1, for example, by the control of the CPU 11.

Figure 3:
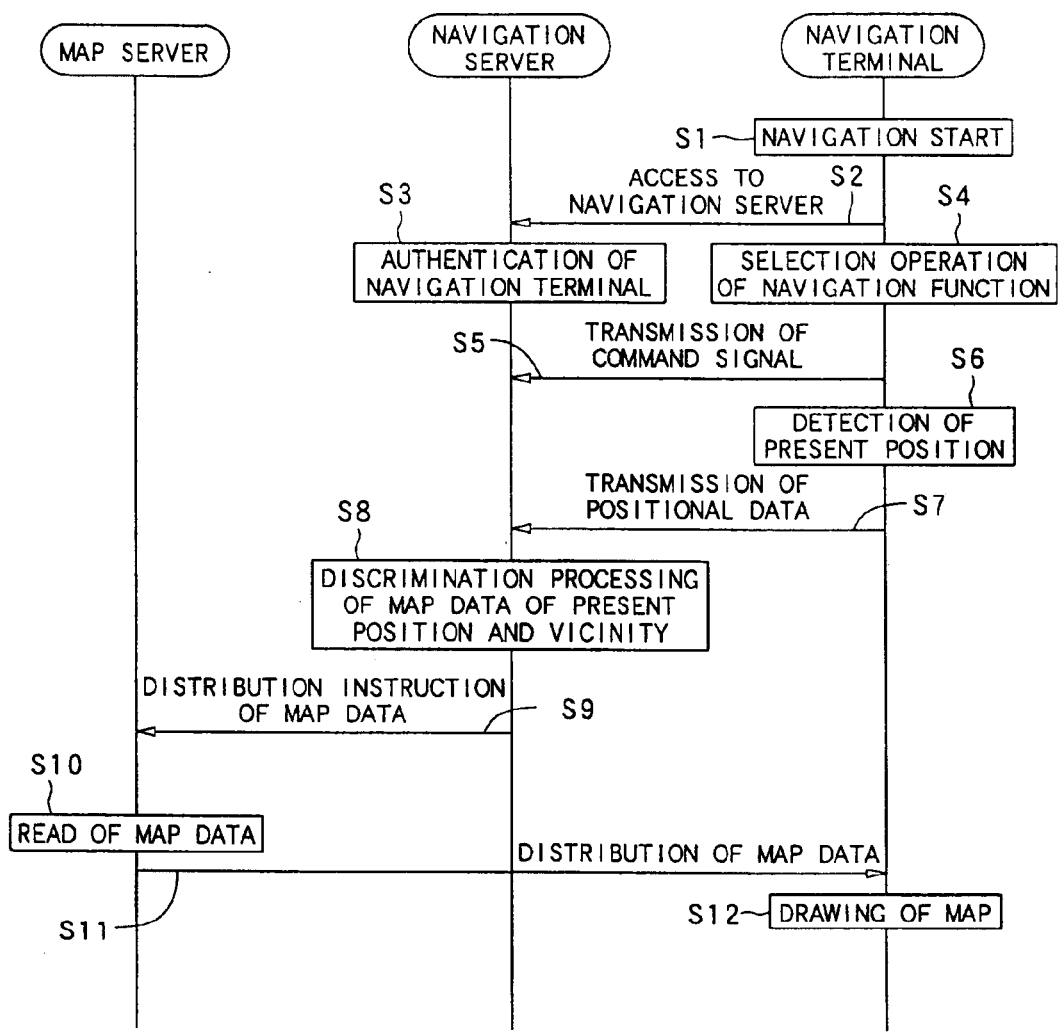
FIG. 3 is a sequence chart showing flows of processing performed corresponding to distribution of map data of a present position and the vicinity of it in the first embodiment.
Figure 4:
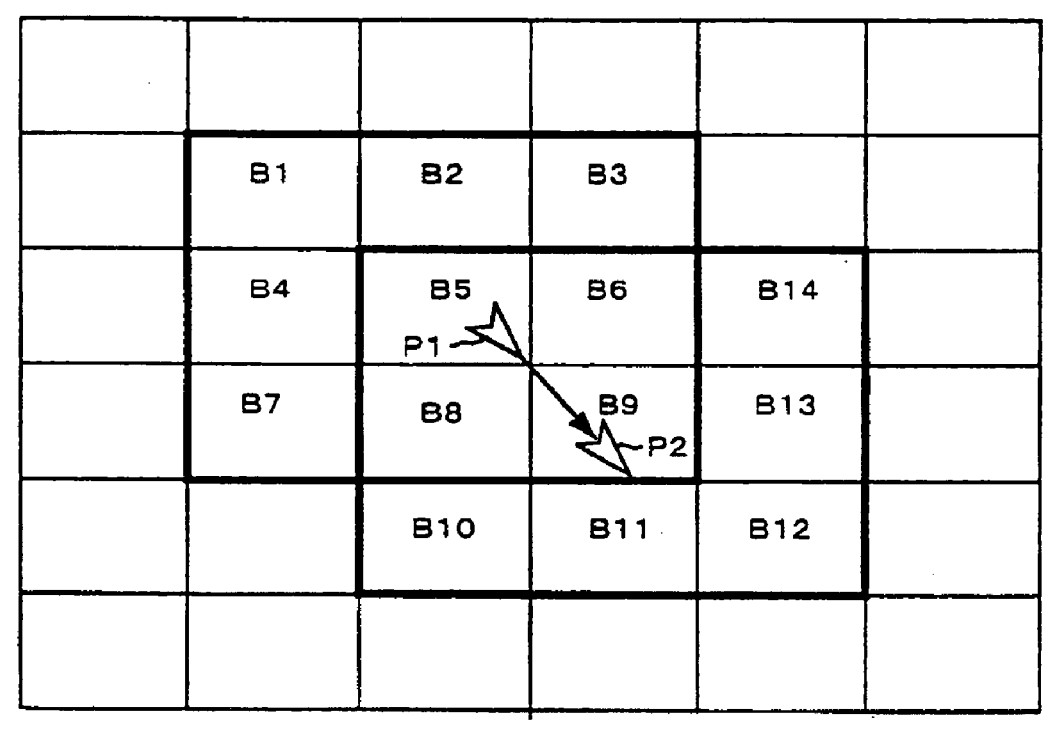
Figure 5:
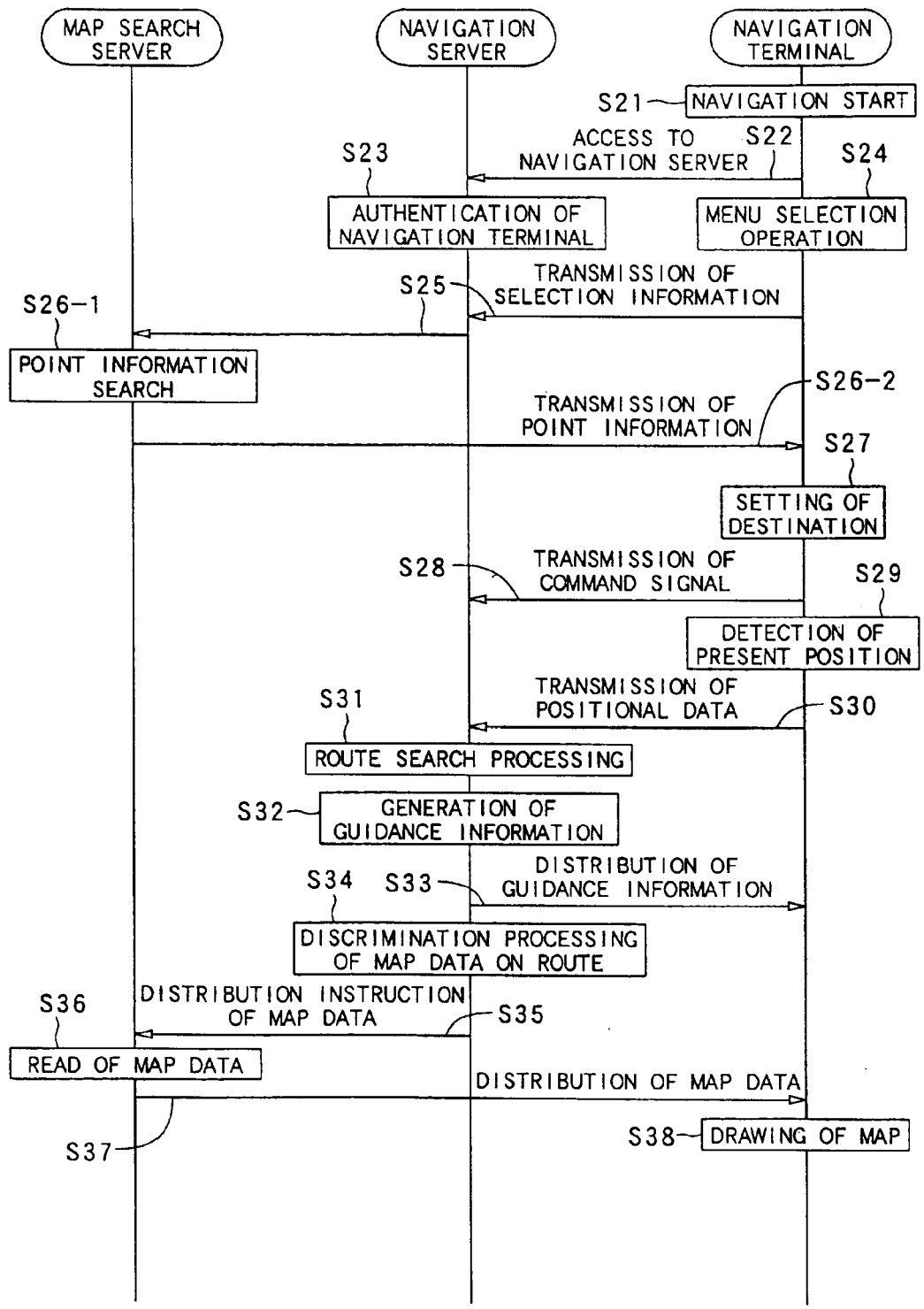
FIG. 5 is a sequence chart showing flows of processing performed corresponding to distribution of map data accompanied by a route search in the first embodiment.
Figure 6:
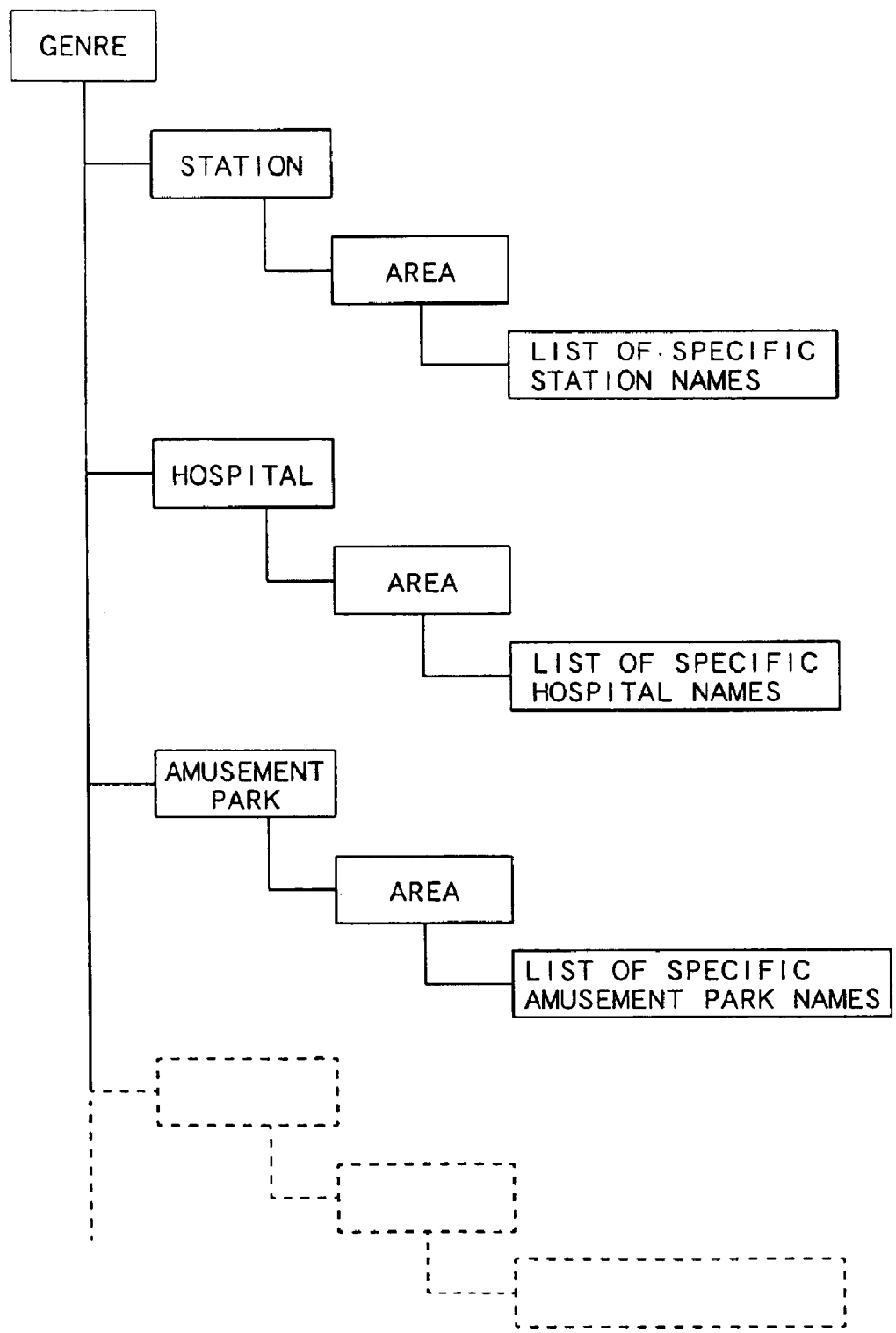
FIG. 6 is a diagram showing a concrete example of setting of a destination in the first embodiment.
Figure 7:
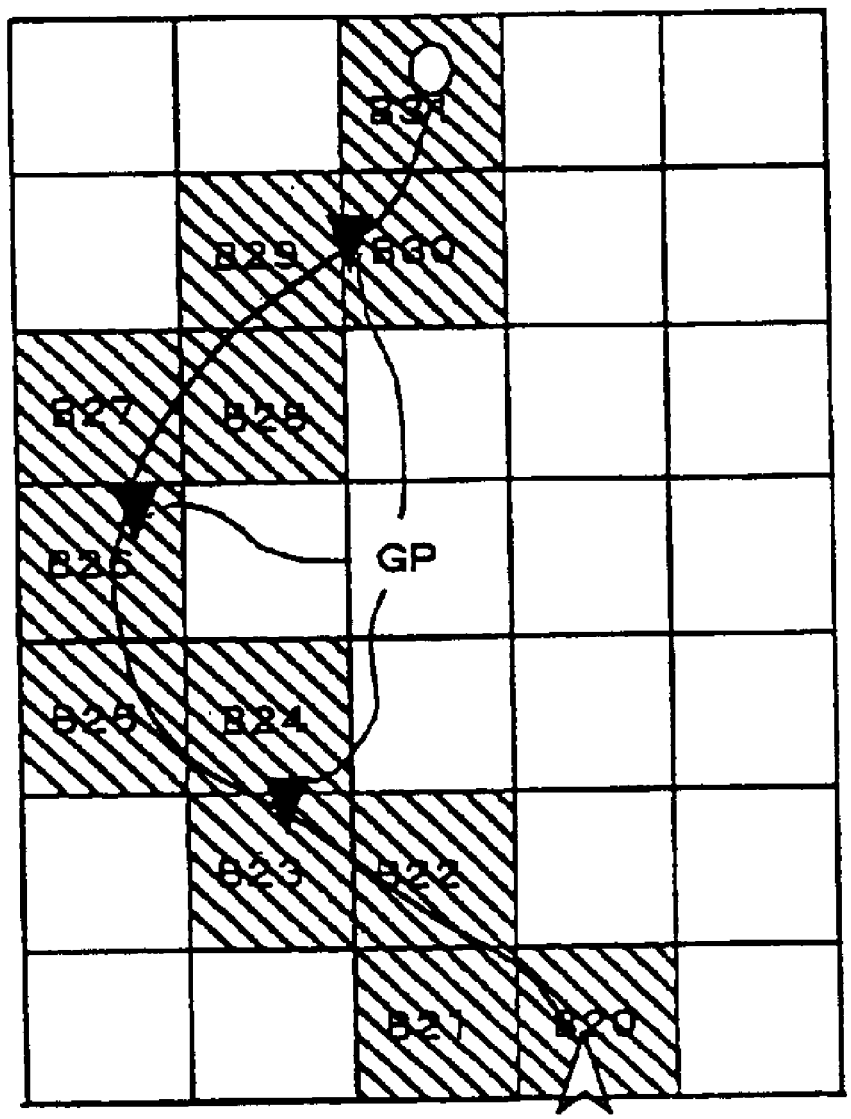
FIG. 7 is a view showing a concrete example of a discrimination method for map blocks to be a distribution object in map data accompanied by a route search in the first embodiment.

Next, flows of processing performed in the first embodiment are explained referring to FIG. 3 to FIG. 7. FIG. 3 and FIG. 4 are diagrams of a case corresponding to map data distribution of a present position and the vicinity of it, and FIG. 5 and FIG. 7 are diagrams corresponding to map data distribution accompanied by a route search.

FIG. 3 is a first sequence chart in the first embodiment. In FIG. 3, shown are flows of data sent and received among the navigation terminal 2, the navigation server 6, and the map search server 7. In reality, although the movable communications network 3, the gateway apparatus 4, and the Internet 5 in FIG. 1 relate to the exchange of data, that is omitted in the sequence chart shown in FIG. 3.

As shown in FIG. 3, when a user performs a predetermined operation by the operation section 16 for the navigation terminal 2, navigation is started (step S1). Then, call originating operation by the wireless communication apparatus 18 is performed, and wireless communication connection to the movable communications network 3 is made so as to specify a predetermined URL (Uniform Resource Locator) to access the navigation server 6 on the Internet 5 via the gateway apparatus 4 (step S2). The navigation server 6 authenticates the navigation terminal 2 (step S3), and one navigation terminal is specified among a plurality of navigation terminals 2 that are management objects. Thus, accompanied by processing for the navigation terminal 2, the management table mentioned above can be updated.

The user, while referring to a menu display on the display section 17, performs a predetermined operation to perform a selection operation of a specific navigation function (step S4). As a selected navigation function, a command signal requiring distribution of map data of a present position and the vicinity of it is sent to the navigation server 6 (step S5).

In the present embodiment, the navigation server 6 needs to acquire positional data of the vehicle 1 during moving in real time. First, in the navigation terminal 2, a present position of the vehicle 1 is detected based on the output from the sensor section 13 and the GPS reception section 14 (step S6) so that positional data showing latitude and longitude are sent to the navigation server 6 (step S7).

The navigation server 6 that has received the positional data implements discrimination processing of the map data of the present position and the vicinity of it corresponding to the command signal of step S5 and the positional data of step S7 (step S8). As this type of navigation function, various applications are prepared in the navigation server 6 as described above. In addition to map data distribution for general road map display, it is possible to selectively implement various functions such as, for example, voice recognition processing for recognizing a command that a user utters and the like.

At step S8, in a case where a usual map display is performed, the navigation server 6 discriminates map data necessary for drawing a map of the vicinity of the vehicle 1. The navigation server 6 determines a map block on which the vehicle 1 is positioned based on the positional data received from the navigation terminal 2 and discriminates several blocks of the vicinity including this map block as map data to be distributed. This is because in order to restrict data size, limiting map data being a distribution object within a predetermined area is effective considering a communication speed and a charge when map data are distributed. A concrete method for discriminating map data to be a distribution object is described later.

Then, the navigation server 6 instructs the map search server 7 to distribute the map data corresponding to the map blocks discriminated as described above to the navigation terminal 2 (step S9). The map search server 7 then reads corresponding map data from the map data base 8 (step S10) and distributes them to the navigation terminal 2 via the Internet 5 (step S11). At this time, facility information related to the map data may be sent along with them, according to a navigation function. At the time of map data distribution at step S11, a fee is charged according to the data size of the map data by the gateway apparatus 4, and its detail is described later.

Distribution timing of the map data of step S11 can be set appropriately. For example, the map data can be distributed immediately after the implementation of steps S9 and S10, and, for example, setting can be made so that the map data can be distributed at a timing where the vehicle 1 approaches the area being a distribution object merely by a predetermined distance.

The navigation terminal 2 finally performs drawing on the display section 17 by employing the map data received (step S12) so that the user can refer to the map of the vicinity of the vehicle 1. Then, according to movement of the position of the vehicle 1, processing of step S6 to step S12 is appropriately repeated and implemented so that map data are continuously updated until navigation is finished.

Next, a concrete example of the method of discriminating map blocks to be a distribution object is explained by employing FIG. 4. FIG. 4 shows the inside of 6×6 block mesh area for the sake of simplicity. It is supposed that map data of nine blocks of the vicinity of the vehicle 1 are employed for drawing processing. First, when the vehicle 1 is running on a position P1, the map data of nine blocks of blocks B1 to B9 are needed for the drawing processing, centrally locating the block B5 containing the position P1. The navigation server 6 chooses the map data of these nine blocks as a distribution object from the map search server 7 to the navigation terminal 2.

Next, when the vehicle 1 moves from the position P1 to a position P2, the map data of nine blocks of the blocks B5, B6, B8, B9, and B10 to B14 wherein the block B9 containing the position P2 is centrally located, are needed for the drawing processing. At this moment, since it is supposed that the blocks B5, B6, B8, and B9 have already been distributed, the navigation server 6 chooses the map data of five blocks of the blocks B10 to B14 as a new distribution object from the map search server 7 to the navigation terminal 2.

In this case, it is desired that the navigation server 6 detects that the vehicle 1 has approached the outer periphery of a block in which the vehicle 1 is included merely by a predetermined distance while considering the time period needed for distribution of map data and discriminates a block existing in the advance direction of the vehicle 1 to predict the map data to be distributed next in advance. With this, it is possible to prevent a situation where the distribution of map data is delayed and drawing in the display section 17 is hindered. Even in a case where the navigation server 6 provides the VICS information or the like, it is preferred that the server 6 sends the VICS information or the like considering vicinity area and an advance direction and the like based on positional data received from the vehicle 1.

In the sequence chart of FIG. 3, map data of the vicinity of the vehicle may be automatically taken in at the time of engine start of the vehicle 2. That is, a function to automatically take map data in may be settable, and when this function is operated, wireless connection is implemented at the time of engine start. Then, positional data are sent to the navigation server 6 as described above to implement distribution of corresponding map data.

The degree of scaling map data down to be distributed may be altered so that different stratum map data may be chosen. For example, instead of distributing map data of plural blocks, a wide area map block (e.g., 2×2 blocks of FIG. 4 are set as one unit) can be a distribution object. In this case, since drawing data become relatively coarse in the wide area map data, the data size needed as map data of the same area can be restrained.

Next, FIG. 5 is a second sequence chart in the first embodiment, and compared with the sequence chart shown in FIG. 3, it is different therefrom that route search processing by the navigation server 6 is implemented. In FIG. 5, steps S21 to S23, S28 to S30, S35 to S38 are implemented similarly to steps S1 to S3, S5 to S7, S9 to S12 of FIG. 3, respectively, whereby explanation therefor is omitted.

First, a concrete example for setting of a destination at steps S24 to S27 of FIG. 5 is explained employing FIG. 6. FIG. 6 shows one example of data structure of menu information for map search displayed when a user sets a destination at the navigation terminal 2. The navigation terminal 2 holds in advance a hierarchical set of menu information for each type and area. A user selects a genre and an area corresponding to a desired destination, referring to a menu display of the display section 17 and operates (step S24). After being once sent to the navigation server 6, selected information by the genre and the area is immediately sent to the map search server 7 (step S25). The map search server 7 searches point information including plural point names corresponding to the selected information received and sends the point information corresponding to the selected information to the navigation terminal 2 (step S26-1, S26-2). The sent point information is reflected onto the menu display of the navigation terminal 2, and from it the user sets a desired goal selectively (step S27).

For example, when the user selects "station" as a genre in the menu information of FIG. 6 and selects "Metropolis of Tokyo" as an area, corresponding area names are sent from the navigation terminal 2 to be menu displayed, and for example, from them, setting of "Sinjuku station" can be implemented as a destination. In a case where a number of corresponding area names are included, the navigation server 6 may send a hierarchical menu further to the navigation terminal 2 so that the user may choose. By implementing such menu display, point search appropriate under wireless communication becomes possible, whereby transmission data amount can be restricted. It is possible to employ a method or the like wherein when a user inputs a destination, he inputs the name of the destination directly by the operation section 16, or the user voice inputs the destination through the microphone 19.

Next, the navigation server 6 which has received the positional data at step S28 implements route search processing (step S31). As a result, the most suitable route leading to the destination that is set in the vehicle 1 is searched, and map blocks on the route is discriminated (step S32) so that guidance information for navigation is generated.

A concrete example of a method of discriminating map blocks to be a distribution object accompanied by route search processing is explained employing FIG. 7. FIG. 7 shows a state where a route leading to a destination PE from a present position PS of the vehicle 1 is searched in a 5×7 block mesh area. As shown in FIG. 7, the present position PS is included in a block B20 and after this, is led to the destination PE via the route superimposing over blocks B21 to B31. Thus, the blocks B20 to B31, twelve blocks in total, are discriminated in the step S28, and corresponding map data and guidance information are selected as a distribution object. In the guidance information, with respect to guidance points GP shown in FIG. 5, information showing advance directions of the vehicle 1 corresponding to positions where the road turns to the right/left is set. The map data of these selected blocks may be distributed at one time or may be divided a plurality of times to be sent when the number of blocks is large.

In FIG. 7, although the map data of map blocks of the vicinity of the route for drawing processing is needed, in reality, similarly to the case of FIG. 5, only map blocks on the route are shown for the sake of simplicity in FIG. 7. Therefore, it is needless to say that in addition to the blocks superimposing over the route searched, map data of their peripheral blocks can be included to be a distribution object.

In the sequence chart of FIG. 5, similarly to the case of FIG. 3, the degree of scaling down of map data to be distributed can be altered. In this case, wide area map data may be distributed in an initial step, and then enlarged narrow area of map data may be distributed whenever necessary according to advance condition of the vehicle 1. Thus, when the vehicle 1 changes its route or the like, useless data transmission can be prevented. It is effective to employ a method together wherein enlarged map data are distributed only for a position and the vicinity of it where guidance of a right/left turn or the like is performed and for other than that wide area map data are distributed. In the sequence chart of FIG. 5 also, distribution is performed similarly to the case of FIG. 3.

Since the navigation terminal 2 utilizes a movable communication method, it is desired that map data are distributed considering this condition. That is, depending on a place of the vehicle 1, it is effective to detect in advance that the vehicle 1 advances toward a place where radio waves do not reach (e.g., a tunnel) because the place cannot be covered by a base station of the movable communications network 3 and to collect and distribute needed map data beforehand. Then, when the vehicle 1 moves to a place where radio waves of a base station reach, distribution of map data is resumed, whereby navigation can be implemented continuously.

Here, considered is a case where a tunnel is installed in the block B30, taking FIG. 7 as an example. In this case, for example, when the vehicle 1 reaches approximately three blocks before the block 30 where the tunnel exists (e.g., the block 27), wide area map data are distributed to the navigation terminal 2 for a time. During a period where radio waves do not reach the vehicle 1, navigation may be performed employing the wide area map data.

At this time, in a case where a hard disk 22 is mounted in the navigation terminal 2 described later, when the vehicle 1 reaches approximately three blocks before the block 30 where the tunnel exists, the map data of the block 30 may be distributed to the navigation terminal 2 beforehand.

In a case where the map search server 7 has a data base constructing one map block based on two sets of information, for example, of indispensable information (roads and place names) and supplementary information (background data and symbols), it is possible to treat only the indispensable information as a distribution object. In this case, when it takes time to distribute all map data due to congestion in communication or the like, change in information to be distributed is implemented suitably. Therefore, when reducing data amount is desired, distributing only the indispensable information is possible.

Next, a structure of a management table of the navigation server 6 in the first embodiment is explained referring to a concrete example of FIG. 8. In the management table shown in FIG. 8, user IDs, contract features, charging information, distribution information and the like are recorded as management information regarding users being under contract. The user ID is referred to when each individual user is identified. The contract feature shows a service content for each user and is a combination of a basic service and an option service as described later. The charging information holds a cumulative total amount of money, for example, for each month in order to charge a user. The distribution information shows data content that has been distributed for a user. The navigation server 6 refers to the management table as the need arises and manages service provision and charging for each user. The management table of FIG. 8 is one example, and in reality yet more management information can be held in the management table.

It is possible that a user of the navigation terminal 2 acquires a data part corresponding to his own user ID in the management table of FIG. 8 to hold it in the memory 12 or the like.

Next, the service contents and charging features are explained with respect to a navigation function performed in the navigation terminal 2 in the first embodiment. In the present embodiment, by incorporating an application in the navigation server 6 or distributing an application to the navigation terminal 2, it is possible to add various services accompanied by the navigation and alter a function easily. By utilizing the gateway apparatus 4 that various telephone companies manage, it becomes possible to charge in a feature in which a charge for a navigation function realized in the navigation system is included in a charge for a telephone call.

FIG. 9 is a view showing a concrete example of services and charging features provided as a navigation function of the first embodiment. As shown in FIG. 9, with respect to the type of service, service is roughly divided into two services composed of the basic service provided in a fixed manner and the option service that a user can select, and a plurality of service items are set for each. A predetermined charge is set in a charging feature set for each service item.

With respect to the basic service in FIG. 9, in addition to map data distribution, point search, and route search by the map search server 7 that are already explained, application search in which a variety of related information is added to map data to be distributed at the time of route search, VICS distribution in which the VICS information described above is distributed to the navigation terminal 2, a telephone function by hands free, and the like are provided. With respect to the option service, voice recognition by which a user can instruct by voice, emergency report service for the emergency report from a user described above, contents distribution by which various contents such as image data other than map data are distributed, and the like are provided.

In FIG. 9, with respect to the charging features defined in each function item, there are various features such as a charge according to sent information amount, a charge according to the number of implementations, a fixed charge for each month, and the like, and a total charge is decided by combining these. In the present embodiment, since each user is charged based on charging information that the gateway apparatus 4 manages and a charging feature in which a navigation function and the telephone function are united is made, the charging feature is convenient for both company and user.

In the first embodiment, the company is assumed to be a server company and a telephone company, and the server company is assumed to be a navigation server management company managing the navigation server 6 and a map search server management company managing the map search server 7. There are following features for cases where these respective business companies charge as described above.

First, there is a feature that a telephone company charges in one lump sum. In this case, it is possible to charge only by the amount of data communication or to charge by the amount of data communication and the type of data (route search, application search, and the like). A telephone company holds the number of uses of the navigation function and the number of data transmissions/receptions or the amount of data as management information for each user and charges each user based thereon. In this case, a predetermined ratio part in a charge collected from each user is paid to each server company.

Second, there is a feature that both of a telephone company and a server company charge. In this case, a telephone company charges only by the amount of data communication, and a part of a charge collected from each user is paid to each server company. The navigation server company charges based on the type of data, the number of uses of an option service, and the like.

Third, there is a feature that each of a telephone company, a navigation server company, and a map search server company charges. In this case, the telephone company charges only by the amount of data communication and pays a part of a charge collected from each user to each server company. The respective navigation server company and map search server company charge based on the type of data and the number of uses of an option service or the number of uses of point search or map data distribution or the like.

(Second Embodiment)

Figure 10:
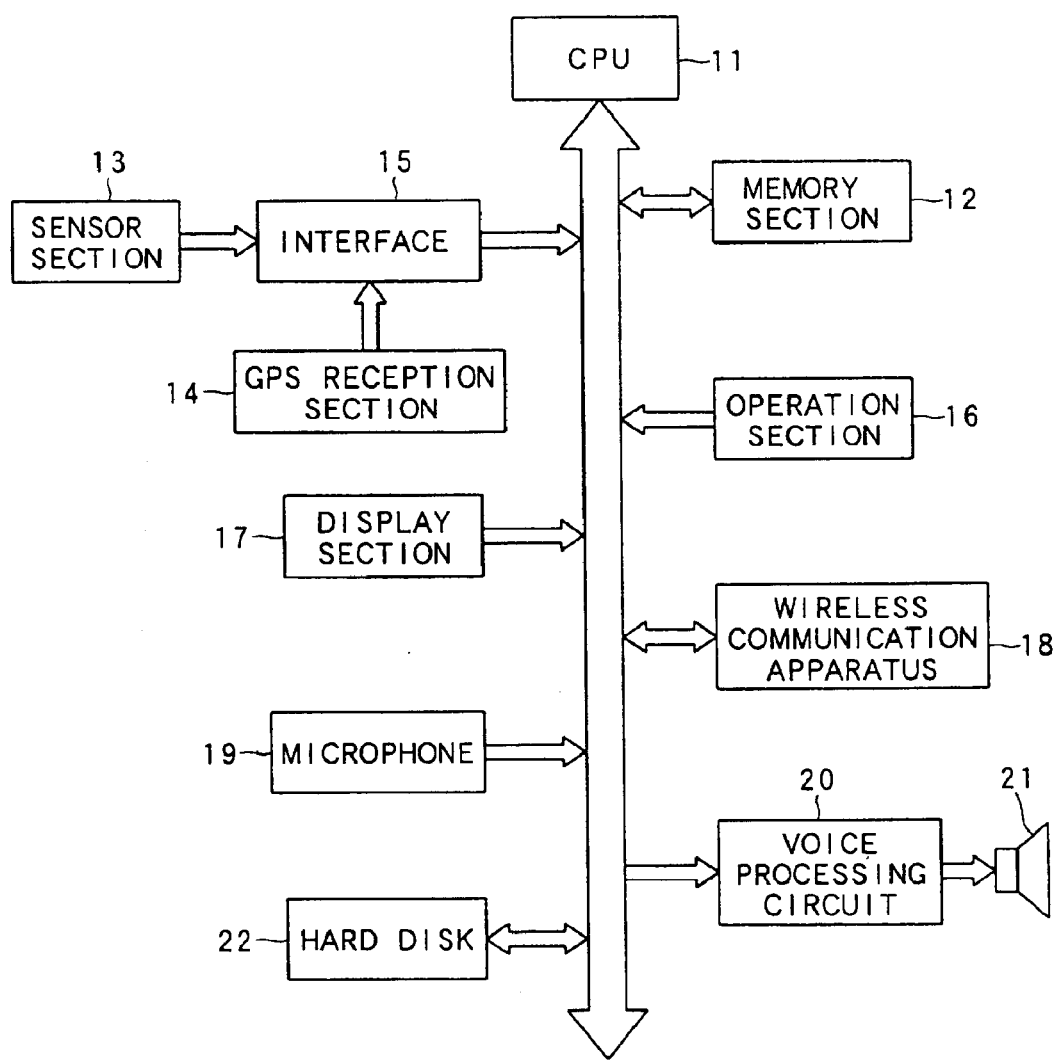
FIG. 10 is a block diagram showing a hardware configuration of a navigation terminal in a second embodiment of the present invention.

FIG. 10 is a diagram showing a hardware configuration of the navigation terminal 2 in the second embodiment. As shown in FIG. 10, in the second embodiment, the hardware is structured in such a manner that a hard disk 22 as a nonvolatile memory device for storing map data received is mounted in the navigation terminal 2 in the first embodiment. Instead of the hard disk 22, a nonvolatile memory device such as a flash memory may be loaded. Since a hard disk can be utilized for other uses, various application programs, contents data, and the like can be stored therein.

Figure 11:
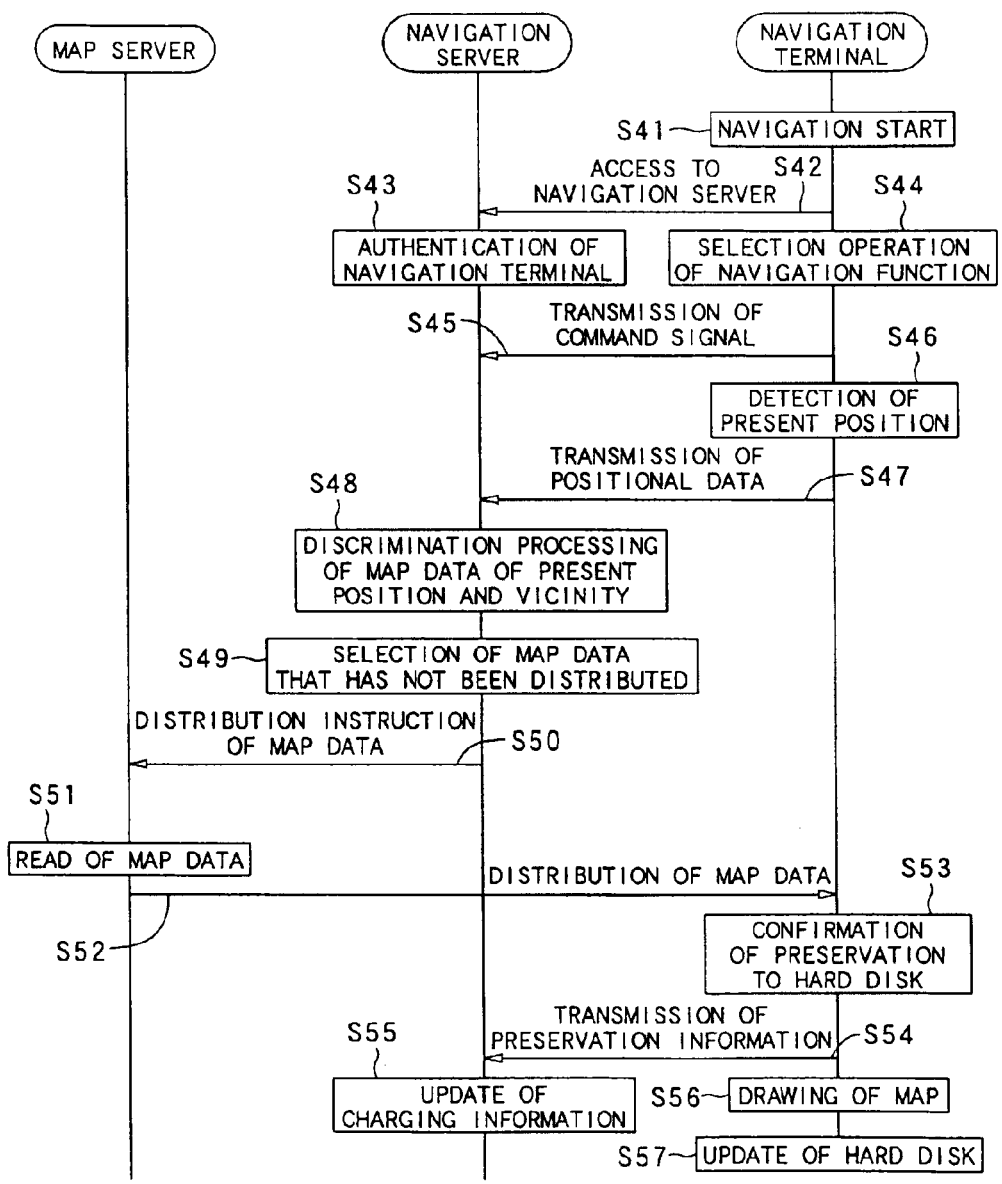
FIG. 11 is a sequence chart showing flows of processing performed corresponding to distribution of map data of a present position and the vicinity of it in the second embodiment.
Figure 12:
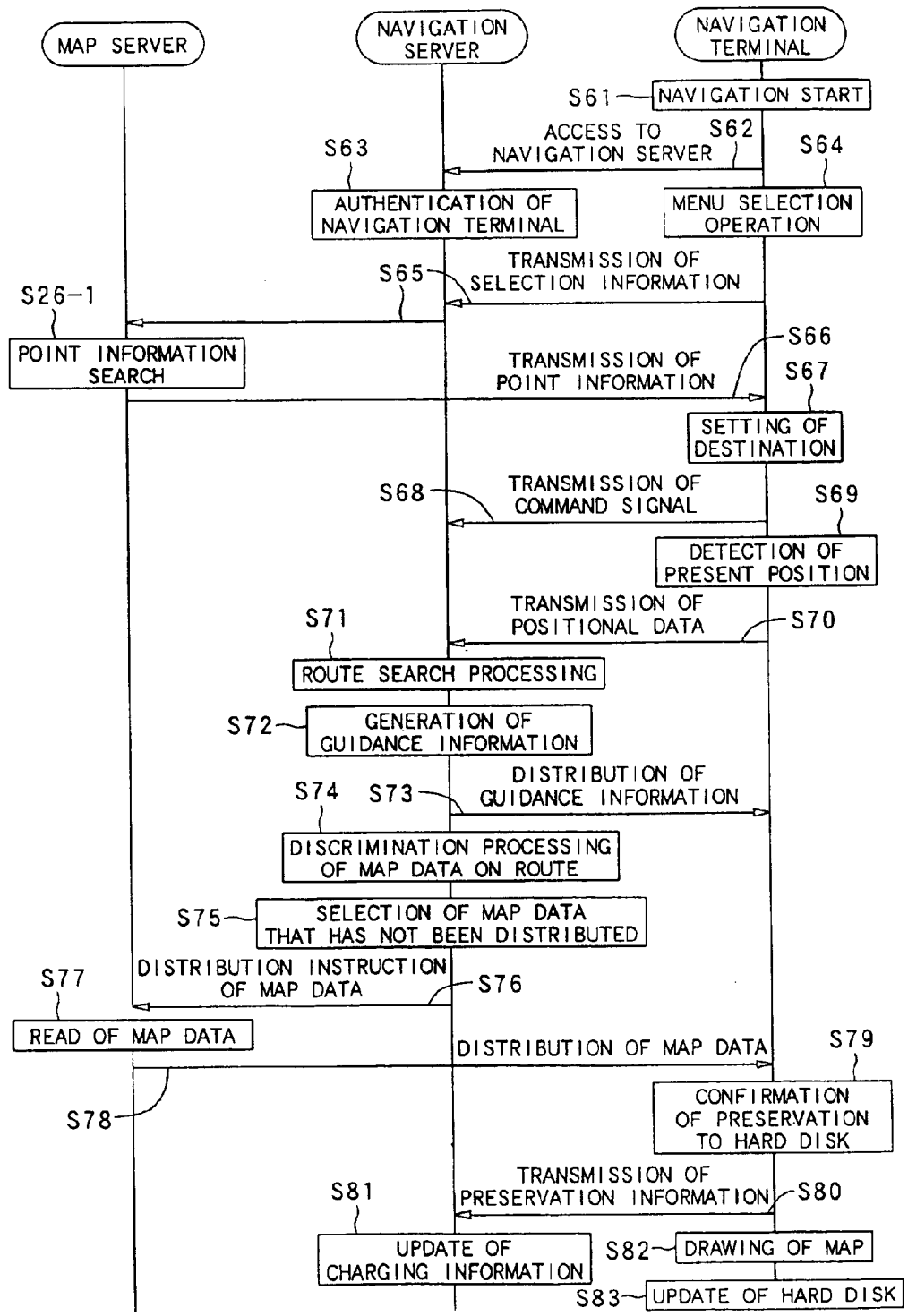
FIG. 12 is a sequence chart showing flows of processing performed corresponding to distribution of map data accompanied by a route search in the second embodiment.

Next, flows of processing performed in the second embodiment will be explained employing FIG. 11 and FIG. 12. FIG. 11 shows a case corresponding to map data distribution of a present position and the vicinity of it, and FIG. 12 is a diagram corresponding to map data distribution accompanied by route search.

FIG. 11 is a first sequence chart in the second embodiment. In FIG. 11, shown are flows of data sent and received among the navigation terminal 2, the navigation server 6, and the map search server 7, similarly to FIG. 3 in the first embodiment.

In FIG. 11, steps S41 to S48, S50 to S52, and S54 are performed similarly to the steps S1 to S12 of the first embodiment (FIG. 3), respectively. In the second embodiment, the map data which has not been distributed yet to the navigation terminal 2 are selected from map data discriminated as those to be distributed to the navigation terminal 2 at step S48 (step S49). That is, since the map data which has already been distributed to the navigation terminal 2 may have been already held in the hard disk 22, in the second embodiment, it is set that the map data already distributed are collated with management data described later and are not included in a distribution object. In addition to a case where whether map data has not been distributed yet is decided based on a map block, in a case where a time stamp is added to map data, when time stamps are different even in the same map block, it may be decided that they have not been distributed. By doing this, it becomes possible to deal with a case where map data are updated due to a new construction of a road, a new establishment of a point, and the like.

In the second embodiment, at the time of drawing processing of the display section 17, the map data which has already been distributed or the map data which has already been stored in the hard disk 22 can be selectively employed. For that reason, a user is confirmed in advance whether or not preservation to the hard disk 22 should be performed (step S53) so that setting can be performed by the operation section 16. Preservation information showing whether or not preservation to the hard disk 22 is performed is sent to the navigation server 6 (step S54). Based on the preservation information the navigation server 6 updates charging information according to whether or not preservation to the hard disk 22 is performed. Therefore, at a time of charging described later, considering additional charging accompanied by preservation of map data to the hard disk 22, for example, a user can select so as to preserve only the map data of a road of frequent use in the hard disk 22 and not to preserve the other map data.

In a case of setting that preservation to the hard disk 22 is performed after drawing processing of a map (step S56), the map data distributed are stored in the hard disk 22 to update the map data in the hard disk 22 (step S57). With this, in the second embodiment, while making use of the hard disk 22, higher speed drawing can be achieved compared with of the first embodiment, and the transmission data amount of the map data distributed can be reduced.

Next, FIG. 12 is a second sequence chart in the second embodiment, corresponds to a case where route search processing by the navigation server 6 is performed, and has a difference that the step S48 of the sequence chart shown in FIG. 11 is substituted for steps S71 to S74. These steps S71 to S74 correspond to the steps S31 to S34 of FIG. 5 explained in the first embodiment. In this second sequence chart also, similarly to the case of the first sequence chart, selection of map data which has not been distributed (step S75), processing accompanied by preservation and confirmation of the hard disk 22 (step S79 to S81), and update of the hard disk 22 (step S83) are performed. This second sequence chart has a difference therefrom that the map data on the route on which a distribution object is set are dealt with.

Next, the structure of the management table of the navigation server 6 in the second embodiment will be explained referring to the concrete example of FIG. 13. The role of the management table shown in FIG. 13 is as explained in the first embodiment (FIG. 8), and various kinds of management information are recorded. In the items of FIG. 13, the user IDs, the contract features, and the distribution information are common to those of FIG. 8, and a difference therefrom is that hard disk preservation information and travel history information are added. The hard disk preservation information corresponds to record of map blocks preserved in the hard disk 22 among the map data distributed to the navigation terminal 2, and the travel history information corresponds to record of how many times a user has traveled in a specific area in the past. The user can download the travel history information from the navigation server 6 and can record it, for example, in the hard disk 22 to make use of it. For example, an occasion may arise where map data of an area where travel frequency is low are deleted from the hard disk 22. Search history information showing history regarding a search condition of a point may be added in the management table of FIG. 13. For example, making use of the search history information enables a utilization for a case where for a user who frequently searches a specific place such as an amusement park, advertisement information related to such place is sent.

Service and charging feature in this second embodiment are common to those of the first embodiment basically. However, as explained by the timing chart of FIG. 11, charge changes in accordance with whether or not preservation to the hard disk 11 is performed. That is, for example, if the charge is 10 yen/one block when preservation to the hard disk 22 is not performed, the charge is set as 30 yen/one block when preservation to the hard disk 22 is performed. By loading the hard disk 11, a convenient charging feature with a high flexibility for users can be realized.

With the navigation system according to the first embodiment or the second embodiment described above, when the user of the vehicle 1 implements navigation, he can utilize system resource constructed over the Internet 5. Thus, it is not necessary to prepare an application such as route calculation or map data with a large data size in the navigation terminal 2, whereby the cost of the apparatus is restrained and the apparatus is advantageous in miniaturization and weight saving. The navigation server 6 and the map search server 7 constructed over the Internet 5 handle processing for many users in a unified way and are not under restrictions of the terminal side, and through them uniform service can be provided. Since positional data of the navigation terminal 2 are acquired, reasonable distribution of map data can be performed. Moreover, by utilizing the function of the gateway apparatus 4, charging users can be performed efficiently.

Although the case where the navigation terminal 2 is loaded and employed in the vehicle 1 is explained in the respective embodiments, the present invention is not limited to this and can be applied to a case where the navigation terminal 2 which can be utilized in a movable body other than vehicles is employed. For example, a feature can be expected wherein the function of the navigation terminal 2 in the present embodiments is added to a commonly utilized portable telephone unit.

Although the case where each of the navigation server 6 and the map search server 7 is connected to the Internet 5 is explained in the respective embodiments, the present invention is not limited to this and can be applied to a case where the navigation server 6 and the map search server 7 are constructed in a unified manner as one server.

As described above, according to the present invention, there is provided a navigation system and method, wherein the function of the navigation system and map data distribution are performed on the Network intensively so that the cost of the apparatus is not increased and a system such as for charging can be constructed reasonably.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-63381 filed on Mar. 3, 2000 including the specification, claims, drawings and summary is incorporated herein by reference in its entirety.

What is claimed is:

1. A navigation terminal comprising:

a wireless communication device connected to a network and operable to transmit and receive data over the network;

a present position detection device operable to detect a present position of a movable body; and an instruction device operable to instruct a predetermined navigation function, wherein the present position and the instructed navigation function are transmitted by the wireless communication device over the network, and a map on which the present position is superimposed and navigation information based on the instructed navigation function are received by the wireless communication device over the network.

2. A navigation terminal as claimed in claim 1, further comprising:

a display device operable to display the map and the present position; and a memory device operable to store at least one of control data and process data.

3. A navigation terminal as claimed in claim 1, further comprising:

a hands-free device operable to enable the navigation terminal to be operated by voice-activation and commands.

4. A navigation terminal as claimed in claim 1, wherein said present position detection device comprises:

a sensor device operable to detect a dynamic trait of the movable body;

a location detection device operable to detect a relative location position of the movable body; and a processor operable to correlate the dynamic trait detected by said sensor device with a corresponding relative location position detected by said location detection device.

5. A navigation terminal as claimed in claim 1, wherein said wireless communication device is operable to transmit and receive both voice communication signals and data.

6. A navigation terminal as claimed in claim 2, wherein the navigation terminal is operable to receive map data from the network over said wireless communication device and store the map in said memory device.

7. A navigation terminal comprising:

a wireless communication device connected to a network and operable to send and receive data;

a present position detection device operable to detect a present position of a movable body;

an instruction device operable to instruct a predetermined navigation function; and a navigation server interface operable to enable communications between the navigation terminal and a navigation server, wherein the navigation server is operable to acquire positional data corresponding to the detected present position via the network, discriminate map data to be a distribution object to the navigation terminal based on the positional data, and provide navigation information based on the instructed navigation function to the navigation terminal; and a map search server interface operable to enable communications between the navigation terminal and a map search server, wherein the map search server comprises a memory device operable to accumulate map data and is operable to read the map data discriminated as the distribution object from the memory device to distribute it to the navigation terminal via the network.

8. A method of processing data for a navigation system, the method comprising:

detecting a present position of a movable body in a navigation terminal;

instructing a predetermined navigation function;

transmitting the instructed navigation function and the present position over a network from the navigation terminal to a navigation server;

determining appropriate navigation data in the navigation server based on the instructed navigation function and the present position;

providing the appropriate navigation data to the navigation terminal over the network.

9. A method as claimed in claim 8, wherein the navigation data is a map.

10. A method as claimed in claim 9, further comprising:

displaying the map on a display portion of the navigation terminal; and superimposing a marker representative of the present position on the displayed map.

11. A method as claimed in claim 8, further comprising:

selecting, from a stored database, an appropriate map based on the present position; and transmitting the appropriate map to the navigation terminal over the wireless network.

12. A method as claimed in claim 8, further comprising:

connecting the wireless network to the Internet; and establishing a communication link between the navigation terminal and the Internet through the wireless network.

13. A method as claimed in claim 12, wherein the communication link comprises both a voice link and a data link.

14. A method as claimed in claim 8, further comprising:

providing optimum route information to the navigation terminal based on the present position.

15. A method as claimed in claim 11, further comprising:

providing optimum route information to the navigation terminal based on the present position and the selected map.

16. A method as claimed in claim 8, further comprising:

selecting, from a stored database, an appropriate map based on the present position;

dividing the selected map into blocks; and transmitting the blocks to the navigation terminal over the wireless network based on the navigation instruction.

17. A method of processing data for a navigation system, the method comprising:

detecting a present position of a movable body in a navigation terminal;

instructing a predetermined navigation function;

acquiring, in a navigation server and via a network, positional data representative of the detected present position;

discriminating map data based on the positional data;

providing navigation information to the navigation terminal via the network, wherein the navigation information is based on the instructed navigation function;

accumulating map data in a memory device of a map search server;

reading discriminated map data from the memory device; and distributing the discriminated map data to the navigation terminal via the network.

18. The navigation terminal as claimed in claim 1, wherein the navigation information received by the wireless communication device comprises at least any one of:

facility information related to the map received by the wireless communication device;

the VICS (Vehicle Information Communication System) information considering a vicinity area of the present position and an advance direction of the movable body;

point information corresponding to a genre and an area selected by a user;

guidance information which information showing advance directions of the movable body corresponding to positions where a road turns to the right/left is set;

supplementary information; and contents information other than the map received by the wireless communication device.

19. The navigation terminal as claimed in claim 1, wherein the navigation information received by the wireless communication device is related to the map received by the wireless communication device.

* * * * *